Patented May 20, 1947

2,420,689

UNITED STATES PATENT OFFICE 2,420,689

PROCESS FOR PRODUCING NUCLEAR SUB-
STITUTED DIMETHYL STYRENES FROM
ASYMMETRIC DIXYLYL ETHANES

Murray Gray Sturrock and Thomas Lawe, Montreal, Quebec, Canada, assignors to Dominion Tar & Chemical Company Limited, Montreal, Quebec, Canada No Drawing. Application November 14, 1944, Serial No. 563,452

10 Claims. (Cl. 260—669)

This invention relates to styrenes having two methyl groups substituted in the nucleus and to processes of producing.

Prior to our invention, no commercial method existed for the production of dimethyl styrenes having the methyl groups substituted in the nucleus. Furthermore, all methods for producing dimethyl styrenes previously, have had the disadvantage that the dimethyl styrenes are contaminated with unpolymerizable aromatic hydrocarbons having no vinyl groups. These aromatic hydrocarbons, which contaminate dimethyl styrenes produced by prior art methods of manufacturing styrenes, are generally impossible to remove from the dimethyl styrenes by distillation, and therefore, pure dimethyl styrenes have not been available.

Impure dimethyl styrenes, that is to say, those containing a relatively large proportion of aromatic hydrocarbons containing only saturated alkyl groups substituted in the nucleus, are not suitable for the production of satisfactory polymers for use in moldings or in coating and the like. The impurities in the styrene interfere with polymerization leading to low-molecular weight products. Moreover, after polymerization, the saturated impurities remain dissolved in the polymer. In the course of time, these low-molecular weight impurities gradually distill out of the molded object leading to strains, distortions and surface imperfections. Polystyrene has many properties which adapt it for many industrial applications but its relatively low heat resistance is one of its disadvantages and this has limited its application for many purposes.

An object of the present invention is to provide dimethyl styrenes which are new compounds.

Another object of the present invention is to provide a process for the production of pure dimethyl styrenes.

A further object of the present invention is to provide a commercial and economical process for the production of dimethyl styrenes.

Still another object of the present invention is to produce di-methyl styrenes which are sufficiently pure to be suitable for polymerization to provide polymers which are satisfactory for molding and for other industrial applications.

One of the other objects of our invention is to provide polymerizable materials which may be used for polymers in the manufacture of moldings which have desirable physical and chemical properties including high heat resistance as compared to similar products produced from styrene.

These and other objects are attained by contacting a vapor comprising an asymmetric dixylyl ethane with a finely divided catalyst which promotes simple molecular decomposition, such as a hydrated aluminum silicate catalyst, at a temperature of at least 350° C. The vapor is preferably fed at such a rate as to provide a contact time with the catalyst (as defined below) between about 0.004 and 0.4 second. It is also preferable that the vapor contain a relatively high proportion of diluent, namely from about 5–25 mols of diluent per mol of dixylyl ethane. This is by reason of the fact that the engineering problems involved are much simplified if a diluent be used in order to obtain the short contact times of vapor and catalyst which produce a good yield of pure product. The preferred diluent is water because water vapor may be easily condensed and thereby separated from the final product and because water vapor apparently maintains the catalyst in a highly active condition.

If 2,5-dimethyl styrene is desired 2,5,2',5'-tetramethyl asymmetric diphenyl ethane is decomposed by our process to produce the 2,5-dimethyl styrene and pure p-xylene. On the other hand, if 2,4-dimethyl styrene, 2,6-dimethyl styrene or mixtures thereof be desired we decompose asymmetric di(m-xylyl) ethane in accordance with the aforementioned process. To produce 2,3-dimethyl styrene or 3,4-dimethyl styrene, or mixtures thereof, asymmetric di(o-xylyl) ethane is employed as a raw material in our process. The particular isomer of asymmetric di(m-xylyl) ethane or of asymmetric di(o-xylyl) ethane is selected to give the desired product. Thus, to obtain the 3,4-dimethyl styrene we use the product obtained by condensing an acetaldehyde with o-xylene using hydrogen fluoride as a catalyst and to produce 2,4-dimethyl styrene we use the product made by condensing an acetaldehyde with m-xylene using the same catalyst.

The following examples, in which the proportions are in parts by weight, are given by way of illustration and not in limitation.

*Example 1*

950 parts of a kaolin catalyst are packed into a converter tube through which 9942 parts of asymmetric di-(o-xylyl) ethane vapor together with 16,600 parts of water vapor are passed through the catalyst at a temperature of 520° C. over a period of 103 minutes. 9769 parts of condensed oil are recovered with a pyrolysis and handling loss of 173 parts of material. The condensed oil was distilled in a stripping still at 30 mm. of mercury absolute pressure. 3866 parts of light oil boiling at that pressure up to 170° C. and 5902 parts of the unreacted dixylyl ethane are collected, leaving a handling and distillation loss of 1 part. Upon fractionation of the light oil 1703 parts of pure o-xylene (M. P. −25° C.) are collected and 1844 parts of dimethyl styrene are obtained. This represents a yield of 94.5% of the theoretical o-xylene and 82.4% of the theoretical dimethyl styrene, both based upon the asymmetric di(o-xylyl) ethane consumed and lost. The contact time in this example is about 0.06 second. The dimethyl styrene distilled at 30 mm. of mercury absolute at 100.7° C. uncorrected, and it melts at −41.6° C. to −40.4° C., uncorrected.

The dimethyl styrene prepared in accordance with this example was analyzed by ozonolysis at −78° C. The ozone absorbed was quantitative based on the vinyl content of the dimethyl styrene. The ozonide secured by this quantitative ozonolysis at −78° C., was decomposed and the aldehydic products oxidized. 3,4-dimethyl benzoic acid was secured from this oxidation and therefore the structure of the dimethyl styrene is found to be 3,4-dimethyl styrene.

50 grams of the dimethyl styrene obtained above, stabilized with hydroquinone, were dissolved in approximately 30 cc. of 95% alcohol and treated with 2 grams of a catalyst having 5% of palladium suspended on charcoal. This solution was then placed in a shaking bottle under a hydrogen pressure of 45–50 pounds per square inch. Reduction occurred rapidly at room temperature and a sharp break occurred in the hydrogen uptake of the solution. The amount of hydrogen absorbed was approximately 100%, indicating that the following reaction in which R is dimethyl phenyl

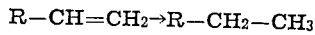

$$R-CH=CH_2 \rightarrow R-CH_2-CH_3$$

was quantitative. The catalyst was removed by filtration and washed with a small amount of alcohol which was added to the mother liquor. The resulting solution was drowned in water and the hydrocarbon layer separated. This hydrocarbon was then steam distilled over dilute caustic solution, in order to remove any hydroquinone, and the distilled material was separated and dried over anhydrous sodium sulfate.

The xylyl ethane obtained by the foregoing reduction was oxidized for two hours with a mixture of 1 volume of concentrated nitric acid and 1 volume of water. After removal of some nitro-aromatic compounds, 3,4-dimethyl benzoic acid was obtained.

The dimethyl styrene, produced in accordance with this example, has an index of refraction at 25° C. of 1.5446 and a density of 25°/4° of 0.9024, a theoretical molecular refraction of 44.31, a calculated molecular refraction of 46.22 and an optical exaltation of 1.91 which is extremely high, and therefore this indicates a very high degree of purity of the 3,4-dimethyl styrene. The high purity of the 3,4-dimethyl styrene is also confirmed by the sharp melting point, by the quantitative absorption of the theoretical hydrogen in the reduction of the dimethyl styrene described above and by the quantitative absorption of ozone in the ozonolysis of the dimethyl styrene.

*Example 2*

960 parts of hydrated aluminum silicate catalyst are packed into a suitable reaction tube and through this 11,733 parts of vaporized crystalline asymmetric di(m-xylyl) ethane, obtained by the selective condensation of acetaldehyde and m-xylene, using a hydrogen fluoride catalyst, (M. P. 38.6° C.) are passed together with 19,400 parts of water vapor over a period of 107 minutes at a temperature of 510–530° C. The catalyst may be reactivated after about half of the material has been passed through the catalyst or a fresh batch of catalyst may be employed to obtain a high conversion. 11,461 parts of condensed oil product are obtained with a pyrolysis and handling loss of 272 parts and distilled in a stripping still to yield 5100 parts of light oil boiling below 150° C. at 30 mm. of mercury and 6,334 parts of unchanged dixylyl ethane with a handling loss of 27 parts of the starting material. Upon fractionation of the light oil at 30 mm. of mercury absolute pressure, 2215 parts of pure m-xylene (M. P. −47.4° C.), 2530 parts of 2,4-dimethyl styrene are obtained. Based upon the dixylyl ethane not recovered, this amounts to 92.2% of the theoretical yield of m-xylene and 84.5% of the theoretical yield of the dimethyl styrene. The contact time in this example is 0.05 second. At the aforementioned pressure the m-xylene boils at 50.5° C., uncorrected, and the dimethyl styrene boils at 95.6° C., uncorrected, and it melts at −64.5° C. to −62° C., uncorrected.

The dimethyl styrene obtained in accordance with this example was analyzed by ozonolysis of the dimethyl styrene at −78° C. followed by oxidation, thereby converting the dimethyl styrene to a dimethyl benzoic acid having the same melting point as the known melting point of 2,4-dimethyl benzoic acid, thereby showing that the dimethyl styrene was the 2,4-dimethyl styrene. This analysis was confirmed by a two-hour nitric acid oxidation of the xylyl ethane, obtained by hydrogenation of the vinyl group of the dimethyl styrene, as described in Example 1. The dimethyl styrene produced in accordance with this example has an index of refraction at 25° C. of 1.5398 and a density 25°/4° of 0.8999, a theoretical molecular refraction of 44.31, a calculated molecular refraction of 46.01. The optical exaltation of the compound is therefore 1.70, which is very high, and it therefore shows that the compound is extremely pure.

*Example 3*

950 parts of a hydrated aluminum silicate catalyst (e. g. kaolin) are packed into a suitable converter and the converter is heated to maintain a temperature of 530° C. and 4660 parts of vaporized 2,5,2′,5′-tetramethyl asymmetric diphenyl ethane (asymmetric di(p-xylyl) ethane, M. P. 64.0° C. uncorrected), together with 9660 parts of water vapor, are passed through the converter over a period of 54 minutes. 4494 parts of condensed oil are obtained with a loss of 166 parts due to pyrolysis and handling. The condensed oil is distilled in a stripping still at 30 mm. of mercury absolute pressure and 2970 parts of light oil boiling up to 150° C. and 1514 parts of the unconverted dixylyl ethane are obtained with a distillation and handling loss of 10 parts of material. The light oil is fractionated at 30 mm. of mercury absolute pressure yielding 1277 parts of pure p-xylene, M. P. 13.3° C. and 1457 parts of 2,5-dimethyl styrene. This represents a yield of 91.0% of the theoretical yield of p-xylene and 83.7% of the theoretical yield of dimethyl styrene, both based upon the di(p-xylyl) ethane consumed and lost. The contact time in this example is 0.06 second. The 2,5-dimethyl styrene distills at 30 mm. of mercury absolute at 94.0° C., uncorrected, and it has a melting point of −36.8° C. to −34.8° C., uncorrected.

Theoretically the only product which could be obtained in accordance with this example is the 2,5-dimethyl styrene and this was confirmed by ozonolysis at −78° C. and oxidation. The 2,5-methyl benzoic acid was obtained and identified thereby showing that the styrene was 2,5-dimethyl styrene.

The 2,5-dimethyl styrene has a refractive index at 25° C. of 1.5370 and a density of 25°/4° of 0.8990, a calculated molecular refraction of 45.85, a theoretical molecular refraction of 44.31, and an optical exaltation of 1.54. Since the optical exaltation is high, this shows that the 2,5-dimethyl styrene is of a high degree of purity.

The 2,3-dimethyl styrene may be obtained in the same manner as described in Example 1 by substituting another isomer of di(o-xylyl) ethane having methyl groups in the 2,3 position while the 2,6-dimethyl styrene may be prepared in the same manner as in Example 2 by substituting the isomer of the di(m-xylyl) ethane having methyl groups in the 2,6 position. These isomers may be prepared by any suitable means, such as by condensation of an acetaldehyde (or acetylene) with the proper xylene isomer and with a suitable catalyst which will preferentially form the desired isomer.

Our dimethyl styrenes are very pure since they contain substantially no aromatic hydrocarbon which does not have a vinyl group. The importance of the purity of polymerizable compounds is well known to those skilled in the art, but in passing it is to be noted that polymers produced from impure materials, i. e., those containing substances which do not enter into the polymerization reaction, have relatively poor physical and chemical properties as compared to the products which are produced from compositions containing no substantial proportion of unpolymerizable material. The purity of our products is such that the melting point range is not more than 3° C. and the optical exaltation is at least 1.

The dixylyl ethane, as indicated in the above examples, is passed through a converter containing a finely divided catalyst of the type described herein. This converter may be a tube constructed of steel, silica or any other desirable material. Furthermore, in large scale operations the converter may comprise a plurality of such tubes or it may be a shell type of converter having one or more layers of trays of catalyst therein.

Since no great amount of heat is evolved or taken up by the decomposition of the dixylyl ethane it is only necessary to make provision for supplying sufficient heat to take care of the conduction and radiation losses in order to maintain the reaction temperature of the vapors passing through the catalyst. Accordingly, we prefer to pre-heat the reacting material and to supply the vapors to the catalyst at the desired reaction temperature.

Asymmetric dixylyl ethanes which are employed as raw materials for the production of the dimethyl styrenes are preferably produced by the reaction of one of the isomers of xylenes with acetaldehyde in the presence of hydrogen fluoride as a catalyst. This process is described and claimed in a co-pending application, Serial No. 563,454, of Murray G. Sturrock, Thomas Lawe and Woodrow Ernest Kemp, entitled "Diaryl paraffins and their production," filed concurrently herewith.

Asymmetric dixylyl ethanes may be produced by any method which will yield materials of sufficient purity. Accordingly, for many purposes asymmetric dixylyl ethanes produced by known methods may be employed.

Activated siliceous catalysts, including the hydrated aluminum silicates, are suitable for our process. We have found that aluminum silicates are effective and we have also found that those catalysts having the relatively higher ratios of silica to aluminum are the most active. However, it has also been found that the more highly active catalysts for a given time of contact are likely to cause the formation of more aromatic hydrocarbon having a saturated side-chain and consequently less of the aromatic hydrocarbon having a vinyl group. This also depends somewhat upon the reaction temperatures and the contact time of the vapor with reaction temperatures and the contact time of the vapor with the catalyst. Accordingly, if highly active catalysts be employed, it is preferable that the contact time be very short.

The catalyst is employed in a finely divided condition fashioned into pellets, which are preferably no larger than about 5 mm. in their greatest diameter. The pellets may be cubical, spherical, or of an irregular granular shape. When large pellets are employed, the vapor velocity varies widely between the center and outside of the pellet, and therefore the contact time at the center of the pellet is longer than desirable. We find that it is desirable to have the particles as fine as possible in order to reduce the difference between the maximum and minimum vapor velocities which occur in the catalyst bed. Obviously, the particle size should not be so small that the catalyst packs thereby causing the vapors to channel through the catalyst instead of passing therethrough in a uniform manner.

The reaction temperature may be varied from about 350° C. up to about 600° C. or even higher in some cases. Temperatures about 600° C. cause some pyrolysis loss, but on the other hand some of the diaryl ethanes are not easily decomposed at lower temperatures. It is particularly important to employ a short time of contact when temperatures in the neighborhood of 600° C. are used in order to avoid an undesired amount of loss due to pyrolysis and side reactions.

Any material which is volatile and which does not react with the diaryl ethane nor with the products formed by decomposition of the diaryl ethane may be used as a diluent. Among these, some examples are water, the hydrocarbons (such as benzene and toluene), the fixed gases (such as nitrogen and carbon dioxide), etc. Water vapor is the preferred diluent inasmuch as it may be readily condensed and thereby separated from the products of the reaction, whereas the fixed gases or the hydrocarbons are somewhat more difficult to separate from the product and such separation requires higher expenditures than are required for the separation of water from the product. Water vapor also has an additional advantage in that it maintains the catalyst in highly active form.

One of the most important reasons for the use of a diluent is that the time of contact of the aromatic compound with the catalyst can be reduced to the desired point easily. It has been found that in order to obtain the short contact times which are desirable in accordance with the present invention, the molal ratio of diluent to the diaryl hydrocarbon in the feed to the catalyst is preferably between about 5:1 and 25:1. If the feed can be supplied rapidly enough to provide a low contact time without the use of a large proportion of diluent the ratio of diluent to diaryl hydrocarbon may be as low as 1:2.

In order to obtain a high yield of pure vinyl substituted aromatic compound, in accordance with the present invention, the velocity of the vapors containing diaryl ethane which are fed to the catalyst should be maintained at such a rate as to provide a time of contact of the vapor with the catalyst between about 0.004 second and about 0.4 second. In order to avoid the contamination of anthracene derivatives by the cyclization of the dixylyl ethane it is preferable that the vapor velocity be as high as possible so that the contact time will be as low as that shown in examples or even considerably lower. This is especially true in the production of 2,5-dimethyl styrene from di(p-xylyl) ethane which tends to form an anthracene derivative somewhat more readily than its isomers.

The calculation of the contact time of the vapor with the catalyst is a relatively complex matter, and in order to simplify this calculation we have used the term "contact time" herein to mean those values which are computed on the assumption that the catalyst contains 50% voids and neglecting both the pressure drop through the catalyst and the increase in volume which occurs during the reaction.

We prefer to employ the shortest possible contact time consistent with a substantial conversion of the diaryl ethane to a relatively pure vinyl aromatic compound together with a similar proportion of an aromatic compound containing no vinyl group. We have found that it is frequently desirable to convert only a few per cent of the diaryl ethane fed to the catalyst in one pass but by recirculating the unconverted diaryl ethane from one to five times or more, a high yield is obtained very economically.

One of the advantages of employing a short contact time with the catalyst of the reacting material is that the life of the catalyst is prolonged almost indefinitely. With contact times of the order of 1 second or more the catalyst becomes fouled in a relatively short period of time due to the deposition of carbonaceous materials on the surface of the catalyst. When it is necessary or desirable to reactivate the catalyst, this may be done by passing heated air, preferably mixed with steam, through the catalyst. The temperature of the air and steam mixture should be raised to about 590–650° C. The air enables the carbon to burn, whereas the steam, which is used in conjunction with the air, keeps the temperature from rising too high, which might cause a reduction in the activity of the catalyst. Generally at temperatures of about 590° C. the carbon begins to burn off and the heat of this reaction causes the temperature to rise to about 650° C., say, without the application of any external heat.

It may be seen that the proximity of the reactivation temperature to the reaction temperature greatly simplifies the change from normal operation to normal reactivation and back to normal operation. Since the normal highly active life of the catalyst greatly exceeds the time required for its reactivation in this manner, the operation of two or more converters in parallel is readily accomplished. The short time of reactivation enables one to keep one or more converters in normal operation while one or more other converters are being reactivated.

Our process may be operated at elevated or reduced pressure, and under some conditions it is particularly advantageous to operate under reduced pressure. If the diaryl ethane which is to be decomposed is not readily volatile at ordinary pressure, reduced pressures may be used thereby facilitating the operation of our process.

We claim:

1. In a method of producing mono nuclear aromatic compounds including dimethyl styrene, a step which comprises heating an asymmetric dixylyl ethane in the presence of a finely divided catalyst which promotes simple molecular decomposition at a temperature of at least 350° C.

2. In a method of producing mono nuclear aromatic compounds including a dimethyl styrene, a step which comprises heating an asymmetric dixylyl ethane both xylyl groups of which have the methyl groups in the same position, at a temperature of at least 350° C. in the presence of a catalyst which promotes simple molecular decomposition and which is a hydrated aluminum silicate.

3. In a method of producing mono nuclear aromatic compounds including a dimethyl styrene, a step which comprises heating di(o-xylyl) ethane at a temperature of at least 350° C. in the presence of a siliceous catalyst which promotes simple molecular decomposition.

4. In a method of producing mono nuclear aromatic compounds including a dimethyl styrene, a step which comprises heating di(m-xylyl) ethane at a temperature of at least 350° C. in the presence of a siliceous catalyst which promotes simple molecular decomposition.

5. In a method of producing mono nuclear aromatic compounds including 2,5-dimethyl styrene, a step which comprises heating 2,5,2',5'-tetramethyl asymmetric diphenyl ethane at a temperature of at least 350° C. in the presence of a siliceous catalyst which promotes simple molecular decomposition.

6. In a method of producing mono nuclear aromatic compounds including a dimethyl styrene, the steps which comprise heating an asymmetric dixylyl ethane at a temperature of at least 350° C. and passing the heated asymmetric dixylyl ethane through a finely divided catalyst which promotes simple molecular decomposition at such a rate as to provide a contact time with the catalyst between about 0.004 second and 0.4 second.

7. In a method of producing mono nuclear aromatic compounds including dimethyl styrene, the steps which comprise heating an asymmetric dixylyl ethane at a temperature of at least 350° C., mixing said dixylyl ethane with a diluent which is also heated to a temperature of at least 350° C. and passing the mixture thereof through a catalyst which promotes simple molecular decomposition and which is a hydrated aluminum silicate.

8. In a method of producing mono nuclear aromatic compounds including a dimethyl styrene, the steps set forth in claim 7 wherein the diluent is water vapor and wherein the molal ratio of said dixylyl ethane to said diluent is between about 5:1 and 25:1.

9. In a method of producing a pure dimethyl styrene, the steps which comprise heating an asymmetric dixylyl ethane at a temperature of at least 350° C. and contacting said dixylyl ethane with a finely divided catalyst which promotes simple molecular decomposition condensing the resulting products and separating the pure dimethyl styrene obtained from said products by distillation.

10. In a method of producing mono nuclear aromatic compounds, including dimethyl styrene, the steps which comprise passing a mixture including an asymmetric dixylyl ethane and water vapor through a catalyst which promotes simple molecular decomposition and which is a hydrated aluminum silicate at such a rate as to provide a contact time with the catalyst between about 0.004 second and 0.4 second while maintaining said mixture at a reaction temperature of at least 350° C.

MURRAY GRAY STURROCK.
THOMAS LAWE.

REFERENCES CITED

The following references are of record in the file of this patent:

UNITED STATES PATENTS

| Number | Name | Date |
|---|---|---|
| 1,552,874 | Ostromislensky et al. | Sept. 8, 1925 |
| 2,110,830 | Dreisback (A) | Mar. 8, 1938 |
| 2,182,313 | Dreisback (B) | Dec. 5, 1939 |
| 2,345,625 | Palmer et al. | Apr. 4, 1944 |
| 2,295,077 | Dreisbach et al. | Sept. 8, 1942 |
| 1,541,175 | Ostromislensky et al. | June 9, 1925 |

OTHER REFERENCES

Harispe, Chem. Abs., vol. 31, 1019 (1937); also in Annales de Chemie, vol. 6, 342–6 (1936). Pat. Off. Lib.)

Klages (A) Berichte, vol. 36, 1639 (1903). (Pat. Off. Lib.)

Klages (B) Berichte, vol. 36, 1637–8 (1903).

Von Braun et al. Berichte, vol. 58, 284–5 (1925); see also Beilstein, Supp. II, page 381. (Division 6.)